Nov. 6, 1934.  W. H. INGERSOLL  1,979,690
VALVE OPERATING MECHANISM
Filed Sept. 8, 1931
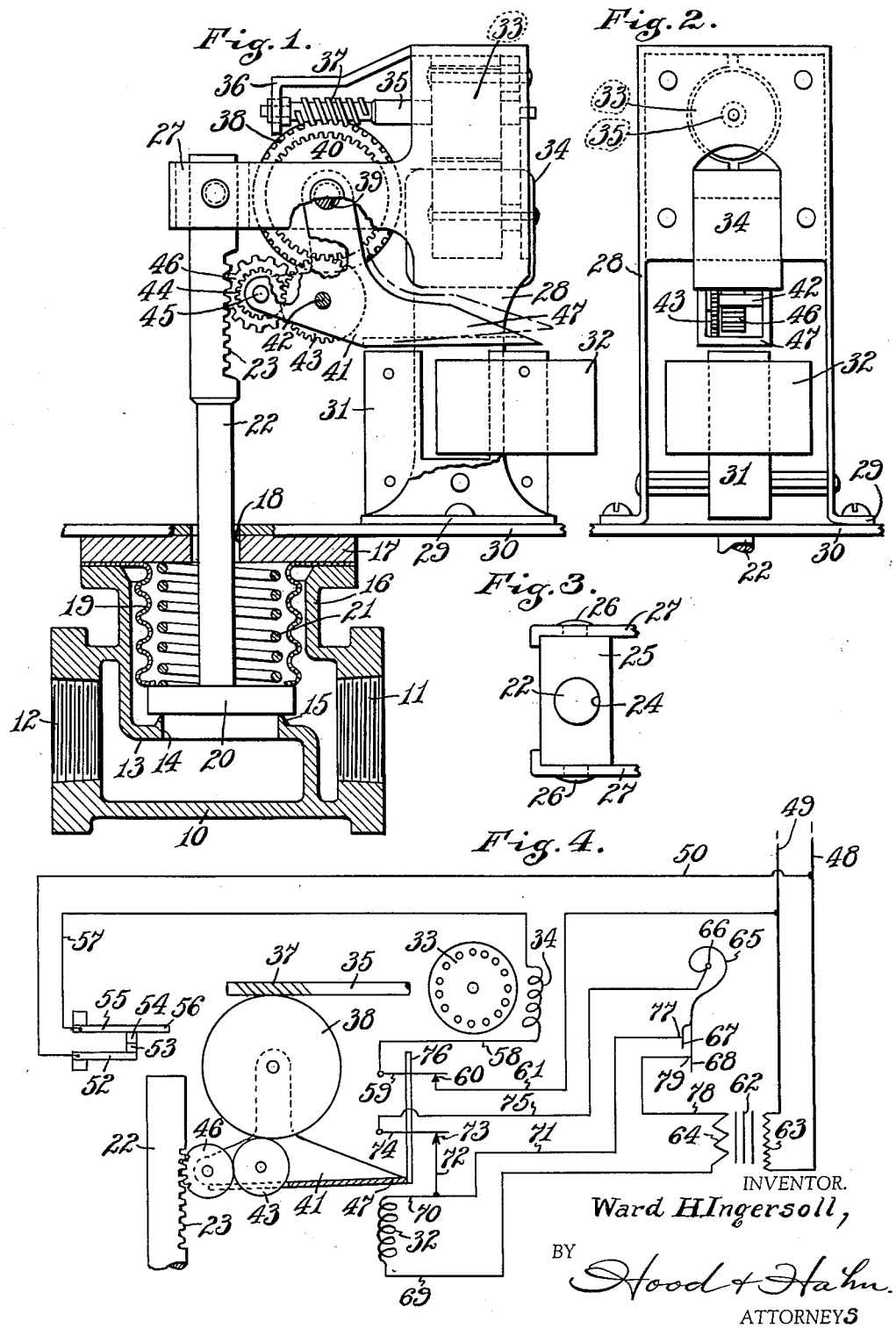
INVENTOR.
Ward H Ingersoll,
BY Hood + Hahn
ATTORNEYS Patented Nov. 6, 1934

1,979,690

UNITED STATES PATENT OFFICE 1,979,690

VALVE OPERATING MECHANISM

Ward H. Ingersoll, St. Paul, Minn., assignor to Minneapolis-Honeywell Regulator Company, Minneapolis, Minn., a corporation of Delaware Application September 8, 1931, Serial No. 561,660

14 Claims. (Cl. 236—74)

The present application relates to means for actuating a shiftable element, and more particularly to means for actuating a valve. Specifically, the invention is concerned with means for actuating a valve comprising a motor for opening the valve, and means for returning the valve to closed position.

There are certain conditions under which it is desirable to open a valve slowly, and to close the same rapidly. For instance, it has been found that, if a gas line is opened quickly, the sudden rush of gas may be hard to ignite, often causing flare backs resulting in burning of the gas in the mixer.

Patent No. 1,678,202 issued to Paul Shivers discloses a motor for opening a valve, but this type of actuating means opens the valve very quickly. Of course, the speed of opening of the valve could be reduced by adding gears to the actuating means disclosed in the Shivers patent, but the actuating means there disclosed is of such character that the gear train and motor must be driven in a reverse direction when the valve is closed. If the gear train of that patent were so designed as to effect the desired slow opening movement, an excessively heavy spring would be required to close the valve, because of the resistance of the gear train. Even if such a heavy spring were supplied, the closing movement would be quite slow, and an excessively large motor would be required to drive the mechanism against the tendency of such a heavy spring. It is, of course, desirable to close a valve of this character rapidly.

An object of the present invention, then, is to provide valve actuating mechanism of such character as to open a valve very slowly, and to close the same very rapidly, the above outlined disadvantages of the modified Shivers construction being overcome. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a side elevation of the actuating means for a valve illustrated in longitudinal section, parts being broken away for clarity of illustration;

Fig. 2 is a front elevation of the actuating means;

Fig. 3 is a top plan of a detail; and

Fig. 4 is a diagram illustrating the operating connections for an actuating mechanism embodying the present invention.

Referring more particularly to the drawing, it will be seen that I have illustrated a valve casing 10 having aligned inlet and outlet openings 11 and 12 separated by a partition 13 provided with an aperture 14 which, in the illustrated embodiment, is formed with an upstanding rim or seat 15. The casing 10 is provided with a neck 16, the open upper end of which is closed by a cover 17 formed with a perforation 18. The valve casing is sealed by a bellows 19 secured between a flange on the neck 16 and the cover 17, and sealed to the upper surface of the valve head 20. A coiled spring 21 bears at its upper end against the upper surface of the head 20 and at its opposite end against the under surface of the cover 17, thus biasing the valve head 20 toward valve-closing engagement with the seat 15.

A stem 22 is secured to the head 20 and projects outwardly of the casing 10 through the perforation 18 in the cover 17. Adjacent its upper end, the stem 22 is formed with rack teeth 23.

The upper end of stem 22 is slidably guided in a bore 24 formed in a block 25 secured by rivets or pins 26 between a pair of arms 27 formed on or carried by a standard 28. The standard 28 is provided with feet 29 which are suitably secured to a base 30 carried by, or secured to, the upper surface of the cover 17.

The standard 28 carries an electro-magnet 31 having the usual energizing winding 32. Said standard further carries a rotary electric motor 33 and the winding 34 therefor. Said motor 33 is provided with a shaft 35, the outer end of which is journaled in a bracket 36 carried by the standard 28. Said shaft 35 is formed with, or carries, a worm 37 with which meshes a worm wheel 38 carried by a shaft 39 journaled in the arms 27. A spur gear 40 is likewise carried by said shaft 39.

A carriage 41 is mounted for oscillation upon the shaft 39, and said carriage provides a mounting for a shaft 42 upon which is carried a gear 43 meshing with the gear 40. A smaller gear 44 is carried on a second shaft 45 mounted in the carriage 41 and meshes with the gear 43; and said shaft 45 further carries a pinion 46 meshing with the rack teeth 23 on the stem 22.

The carriage 41 is so balanced that said carriage normally assumes the position illustrated in dotted lines in Fig. 1, wherein the pinion 46 is held out of meshing engagement with the teeth 23.

Said carriage is formed with a projection 47 operatively associated with the magnet 31 so that, when said magnet 31 is energized, by energization of the coil 32, said arm 47 is drawn into the full line position of Fig. 1, thus shifting the carriage 41, and moving the pinion 46 into meshing relation with the teeth 23 on the stem 22.

Referring, now, to Fig. 4, it will be seen that I have illustrated a source of electrical energy comprising a pair of line wires 48 and 49. A wire 50 is connected to the line 48 and connected at its opposite end to a switch arm 52 carrying a contact element 53 with which is associated a contact element 54 carried upon a second switch arm 55, the elements 53 and 54 being normally in contact with each other. Said arm 55 is formed with a projecting finger 56 disposed in the path of movement of the upper end of the stem 22, as is clearly illustrated in Fig. 4. A wire 57 is connected to the arm 55 and to one end of the motor coil 34, the opposite end of said coil being connected by a wire 58 with a second switch arm 59 operatively associated with a contact point 60 connected by a wire 61 to the line 49. The arm 59 is normally out of contact with the point 60.

I prefer to provide a step-down transformer 62 comprising a primary coil 63 connected between the line wires 48 and 49 and a secondary coil 64. The secondary circuits are controlled by switch mechanism which, in the illustrated embodiment, comprises a thermostat 65, of well known construction, said thermostat comprising a central terminal 66 and a pair of terminal fingers 67 and 68.

A wire 69 connects one end of the secondary coil 64 with one end of the magnet winding 32. A wire 70 is connected to the opposite end of said winding 32, and a wire 71 connects said wire 70 with a contact point 77 associated with the finger 67 of the thermostat 65. A wire 72 connects the wire 70 with a contact point 73 with which is associated a switch arm 74 connected by a wire 75 with the terminal 66 of the thermostat 65. The opposite end of the secondary coil 64 is connected by a wire 78 with a contact point 79 associated with the finger 68 of the thermostat 65.

The thermostat 65 is so constructed that the finger 68 makes contact with the point 79 before the finger 67 makes contact with the point 77; and the finger 67 breaks contact before contact is broken between the finger 68 and the point 79.

The switch arms 59 and 74 are suitably connected to the arm 47 of the carriage 41 in any desired manner, a rod 76 being illustrated in Fig. 4 as the connecting means in the present embodiment.

While the operation of the above described mechanism will be obvious, a short description thereof may not be amiss. The primary coil 63 of the transformer 62 is, of course, always energized. If the thermostat 65 calls for heat, the finger 68 will contact the point 79, but no circuit is closed immediately upon the making of this contact because of the breaks in the possible circuits at 73—74 and 67—77. When, however, the finger 67 contacts the point 77, an energizing circuit for the coil 32 is established as follows: 64, 69, 32, 70, 71, 77, 67, 68, 79, and 78. Immediately upon energization of the coil 32, the carriage 51 is drawn into the full line position of Fig. 1, thus moving the pinion 46 into meshing engagement with the teeth 23 of the stem 22, and moving the switch arms 59 and 74 into contact with the points 60 and 73, respectively. Closure of the switch 73—74 establishes a holding circuit for the coil 32 as follows: 64, 69, 32, 70, 72, 73, 74, 75, 66, 68, 79, and 78. Closure of the switch 59—60 establishes an energizing circuit for the coil 34 of the motor 33 as follows: 48, 50, 52, 53, 54, 55, 57, 34, 58, 59, 60, 61, and 49.

The motor 33 is thus driven to rotate the shaft 35 and worm 37 to drive the worm wheel 38 and gear 40. The gear 40 drives, through the gears 43 and 44, the pinion 46 which, because of its meshing engagement with the teeth 23, elevates the stem 22 and head 20 against the tendency of spring 21. As the stem 22 approaches the limit of its upward stroke, the upper end of said stem engages the finger 56 of the switch arm 55 and lifts the contact element 54 out of contact with the element 53, thus breaking the energizing circuit for the motor 33. The gear train between the motor 33 and the rack 23 is so proportioned that the upward movement of the stem 22 is very slow.

Opening of the energizing circuit for the motor 33 does not in any way affect the energizing circuit for the coil 32, and consequently the carriage 41 is held in the full line position of Fig. 1. The driving relation between the worm 37 and worm wheel 38 is, of course, an irreversible one, and consequently, the valve stem 22 will be held in its adjusted position, against the tendency of the spring 21, as long as the carriage 41 is held in a position in which the pinion 46 meshes with the teeth 23.

When the heating demands of the space within which the thermostat 65 is mounted have been satisfied, the finger 67 will move out of contact with the point 77. The coil 32 is not affected, however, until the finger 68 moves out of contact with the point 79. When this contact is broken, the coil 32 is immediately deenergized, and the carriage 41 moves to the dotted line position of Fig. 1 under the influence of its own bias combined with the tendency of the teeth 23 acting on the pinion 46 under the influence of spring 21. The valve head 20 is moved into valve closing engagement with its seat 15 substantially instantaneously upon deenergization of the coil 32.

I claim as my invention:

1. In combination, a valve including a valve-actuating stem, a motor, a gear train including a gear permanently associated with said motor and a second gear permanently associated with said first gear and movable into and out of operative association with said stem, and a second motor for shifting said second gear.

2. In combination, a valve including a reciprocable head and a stem connected thereto, means biasing said valve toward closed position, and means for moving said head against the tendency of said biasing means, including a motor, a gear train including a gear permanently associated with said motor and a second gear permanently associated with said first gear and movable into and out of operative association with said stem, and a second motor for shifting said second gear.

3. In combination, a reciprocable element, a rotary motor, a worm driven by said motor, a worm wheel meshing with said worm, a gear coaxial with and movable with said worm wheel, a carriage oscillable about the axis of said gear, transmission mechanism carried by said carriage and meshing with said gear, and means for shifting said carriage to move said transmission mechanism into and out of cooperative engagement with said reciprocable element.

4. In combination, a reciprocable element, a rotary motor, a worm driven by said motor, a worm wheel meshing with said worm, a gear coaxial with and movable with said worm wheel, a carriage oscillable about the axis of said gear, transmission mechanism carried by said carriage and meshing with said gear, and a motor for shifting said carriage to move said transmission mechanism into and out of cooperative engagement with said reciprocable element.

5. In combination, a reciprocable rack, a rotary motor, a worm driven by said motor, a worm wheel meshing with said worm, a gear coaxial with and movable with said worm wheel, a carriage oscillable about the axis of said gear, gear means carried by said carriage and meshing with said gear, and an electro-magnet associated with said carriage and operable, when energized, to shift said carriage to move said gear means into mesh with said rack.

6. In combination, a reciprocable element, an electric motor, transmission means shiftable to connect said motor to drive said element or to disconnect the same, a second electric motor for shifting said transmission means, a source of electrical energy, a circuit for said first motor, a circuit for said second motor, thermo-responsive means controlling said last-mentioned circuit, and a switch in said first-mentioned circuit and controlled by said second motor.

7. In combination, a reciprocable element, an electric motor, transmission means shiftable to connect said motor to drive said element or to disconnect the same, a second electric motor for shifting said transmission means, a source of electrical energy, a circuit for said first motor, a circuit for said second motor, thermo-responsive means controlling said last-mentioned circuit, a normally open switch in said first-mentioned circuit, and means actuated by energization of said second motor to close said switch.

8. In combination, a reciprocable element, an electric motor, transmission means for connecting said motor to drive said element in one direction, said means including a member shiftable into and out of operative association with said element and biased toward a position out of such association, a second electric motor operable, when energized, to move said member into operative association with said element, a source of electrical energy, a circuit for said second motor, a switch for controlling said circuit, a circuit for said first motor, a normally open switch in said last-mentioned circuit, and means operable upon energization of said second motor to close said last-mentioned switch.

9. In combination, a reciprocable element, an electric motor, transmission means for connecting said motor to drive said element in one direction, said means including a member shiftable into and out of operative association with said element and biased toward a position out of such association, a second electric motor operable, when energized, to move said member into operative association with said element, a source of electrical energy, a circuit for said second motor, a switch for controlling said circuit, a circuit for said first motor, a normally open switch in said last-mentioned circuit, means operable upon energization of said second motor to close said last-mentioned switch, and a normally closed switch in said last-mentioned circuit, said switch having an element disposed in the path of said reciprocable element whereby said reciprocable element, when moved to the limit of its stroke by said first motor, will open said last-mentioned switch to deenergize said first motor.

10. In combination, a source of electrical energy; an electric motor; a circuit for said motor including said source, a normally open switch, and a normally closed switch; a movable element; transmission mechanism shiftable to connect said motor to drive said element, said mechanism being normally ineffective to connect said motor and element; a second electric motor operatively associated with said transmission mechanism and operable, upon energization, to shift said transmission mechanism to connect said first motor and said element; a circuit for said second motor including said source and a switch; means operable upon energization of said second motor to close said normally open switch; and means operable by movement of said first element under the influence of said first motor to open said normally closed switch.

11. In combination, a source of electrical energy; an electric motor; a circuit for said motor including said source, a normally open switch, and a normally closed switch; a movable element; transmission mechanism shiftable to connect said motor to drive said element, said mechanism being normally ineffective to connect said motor and element; a second electric motor operatively associated with said transmission mechanism and operable, upon energization, to shift said transmission mechanism to connect said first motor and said element; a circuit for said second motor including said source and a thermo-responsive switch; a second circuit for said second motor including said source, a second thermo-responsive switch, and a second normally open switch; means operable upon energization of said second motor to close both of said normally open switches; and means operable by movement of said element under the influence of said first motor to open said normally closed switch.

12. In combination, a shiftable element, an electric motor, an energizing circuit therefor, means for controlling said circuit, transmission mechanism including a member shiftable to establish and disestablish a driving connection between said motor and said element, an electric motor for shifting said member, an energizing circuit for said second-mentioned motor, said second-mentioned motor being operable, upon energization, to move and hold said member to establish such driving connection, and means for controlling said last-mentioned circuit, said means being operable to energize said last-mentioned circuit only upon operation of said first-mentioned means to energize said first-mentioned circuit.

13. In combination, a fluid flow controlling element biased to one of its fluid flow controlling positions, an electric motor, transmission means for connecting said motor to said element, a switch, an electro-magnetic coil, an armature controlled thereby, connections between said armature, transmission means and switch for rendering the transmission means operative and for closing said switch upon energization of said electro-magnetic coil, a motor circuit controlled by said switch, and means for controlling the energization of said electro-magnetic coil.

14. In combination, a fluid flow controlling element biased to one of its fluid flow controlling positions, an electric motor, transmission means for connecting said motor to said element, a switch, an electro-magnetic coil, an armature controlled thereby, connections between said armature, transmission means and switch for rendering the transmission means operative and for closing said switch upon energization of said electro-magnetic coil, a switch associated with said fluid flow controlling element and moved to open position when said element is moved to a new position against its bias, a motor circuit controlled by said two switches in series, and a condition-responsive device for controlling the energization of said electro-magnetic coil.

WARD H. INGERSOLL.